(12) United States Patent
Shang et al.

(10) Patent No.: US 12,321,254 B2
(45) Date of Patent: Jun. 3, 2025

(54) INTERNATIONALIZATION OF AUTOMATED TEST SCRIPTS

(71) Applicant: MICRO FOCUS LLC, Santa Clara, CA (US)

(72) Inventors: Er-Xin Shang, Shanghai (CN); Qian-Ru Zhai, Shanghai (CN); Hao-Bin Cui, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 444 days.

(21) Appl. No.: 17/435,506

(22) PCT Filed: Mar. 8, 2019

(86) PCT No.: PCT/CN2019/077496
§ 371 (c)(1),
(2) Date: Sep. 1, 2021

(87) PCT Pub. No.: WO2020/181417
PCT Pub. Date: Sep. 17, 2020

(65) Prior Publication Data
US 2022/0138088 A1    May 5, 2022

(51) Int. Cl.
*G06F 11/36* (2006.01)
*G06F 9/451* (2018.01)
(Continued)

(52) U.S. Cl.
CPC .......... *G06F 11/3684* (2013.01); *G06F 9/454* (2018.02); *G06V 10/20* (2022.01); *G06V 10/40* (2022.01); *G06V 30/10* (2022.01)

(58) Field of Classification Search
CPC .......... G06F 11/36–3696; G06F 9/454; G06F 40/00–58; G06V 10/20; G06V 10/40; G06V 30/10
See application file for complete search history.

(56) References Cited

U.S. PATENT DOCUMENTS 8,527,950 B2 *  9/2013  Berry ................. G06F 9/454
                                                        717/124
8,875,103 B2 * 10/2014  Yun .................... G06F 9/454
                                                        717/124
(Continued)

FOREIGN PATENT DOCUMENTS

CN        102411538 A     4/2012
CN        102567201 A     7/2012
(Continued)

OTHER PUBLICATIONS

"Localization, Globalization & Linguistic Testing Services," QA InfoTech, 2018, 4 pages [retrieved online from: qainfotech.com/globalization-testing-services.html].
(Continued)

*Primary Examiner* — Todd Aguilera
(74) *Attorney, Agent, or Firm* — Sheridan Ross P.C.

(57) ABSTRACT

According to examples, an apparatus may include a processor that may internationalize an automated test script that was generated to test a Graphical User Interface (GUI) in the first human language. When the GUI is internationalized into a second human language, the automated test script may no longer function. As such, the system may employ computer vision techniques to analyze the GUI in the first human language and the GUI in the second human language to identify text and GUI elements that correlate with one another. Based on the correlation, the system may internationalize the automated test script to function on the GUI in the second human language.

19 Claims, 7 Drawing Sheets

(51) Int. Cl.
*G06F 11/3668* (2025.01)
*G06V 10/20* (2022.01)
*G06V 10/40* (2022.01)
*G06V 30/10* (2022.01)

(56) References Cited

U.S. PATENT DOCUMENTS

| | | | |
|---|---|---|---|
| 8,938,383 B2 | 1/2015 | Ding et al. | |
| 9,189,135 B2 | 11/2015 | Chaturvedi | |
| 10,489,126 B2* | 11/2019 | Kumar | G06V 30/422 |
| 10,832,012 B2* | 11/2020 | Nomura | G06F 40/30 |
| 2008/0115111 A1 | 5/2008 | Chang | |
| 2010/0042929 A1* | 2/2010 | Berry | G06F 9/454 |
| | | | 715/738 |
| 2011/0283261 A1* | 11/2011 | Yun | G06F 9/454 |
| | | | 717/124 |
| 2018/0173614 A1* | 6/2018 | Gong | G06F 11/3664 |
| 2018/0189170 A1 | 7/2018 | Dwarakanath et al. | |
| 2019/0018842 A1* | 1/2019 | Nomura | G06F 40/58 |
| 2019/0250891 A1* | 8/2019 | Kumar | G06T 7/70 |

FOREIGN PATENT DOCUMENTS

| | | |
|---|---|---|
| CN | 103136094 B | 8/2016 |
| CN | 106294178 A | 1/2017 |
| WO | WO-WO2015165078 A1 | 11/2015 |

OTHER PUBLICATIONS

Jonasson "The Automation of Globalization UI Testing," Globalization and Localization Association, Oct. 18, 2016, 8 pages [retrieved online from: www.gala-global.org/blog/automation-globalization-ui-testing].

Nangwaria "An Introduction to Localized Testing," 3Pillar Global, Inc., 2016, 8 pages [retrieved online from: www.3pillarglobal.com/insights/an-introduction-to-localized-testing].

Wang et al. "Multilingual Automation Testing Solution," IBM, Feb. 26, 2013, 12 pages [retrieved online from: www.ibm.com/developerworks/rational/library/multilingual-automation-testing-solution/index.html ].

International Search Report and Written Opinion prepared by the ISA/CN on Nov. 20, 2019, for International Application No. PCT/CN2019/077496.

* cited by examiner

500

OBTAINING AN AUTOMATED TEST SCRIPT IN A FIRST HUMAN LANGUAGE, THE AUTOMATED TEST SCRIPT TO AUTOMATICALLY TEST A GRAPHICAL USER INTERFACE (GUI) IN THE FIRST HUMAN LANGUAGE, IN WHICH THE GUI INCLUDES A USER INTERFACE (UI) ELEMENT, THE UI ELEMENT INCLUDING AN IMAGE FEATURE AND A FIRST WORD OR PHRASE IN THE FIRST HUMAN LANGUAGE
502

↓

OBTAINING, BY THE PROCESSOR, AN IMAGE OF A SECOND VERSION OF THE GUI IN A SECOND HUMAN LANGUAGE
504

↓

TRANSLATING, BY THE PROCESSOR, A SECOND WORD OR PHRASE OF THE SECOND VERSION OF THE GUI INTO THE FIRST HUMAN LANGUAGE BASED ON THE IMAGE
506

↓

DETERMINING, BY THE PROCESSOR, THAT THE TRANSLATED SECOND WORD OR PHRASE CORRESPONDS TO THE FIRST WORD OR PHRASE
508

↓

IDENTIFYING, BY THE PROCESSOR, THE UI ELEMENT IN THE SECOND VERSION OF THE GUI RESPONSIVE TO THE DETERMINATION THAT THE TRANSLATED SECOND WORD OR PHRASE CORRESPONDS TO THE FIRST WORD OR PHRASE
510

↓

GENERATING, BY THE PROCESSOR, A SECOND VERSION OF THE AUTOMATED TEST SCRIPT IN THE SECOND LANGUAGE BASED ON THE IDENTIFICATION OF THE UI ELEMENT
512

*FIG. 5*

```
┌─────────────────────────────────────────────────────────────┐
│           NON-TRANSITORY MACHINE-READABLE MEDIUM            │
│                            600                              │
│  ┌───────────────────────────────────────────────────────┐  │
│  │  OBTAIN A FIRST IMAGE OF A FIRST USER INTERFACE (UI)  │  │
│  │    ELEMENT OF A GUI, THE GUI BEING IN A FIRST HUMAN   │  │
│  │  LANGUAGE AND THE FIRST IMAGE HAVING A FIRST WORD OR  │  │
│  │           PHRASE IN THE FIRST HUMAN LANGUAGE          │  │
│  │                          602                          │  │
│  └───────────────────────────────────────────────────────┘  │
│  ┌───────────────────────────────────────────────────────┐  │
│  │   IDENTIFY THE FIRST WORD OR PHRASE OF THE FIRST UI   │  │
│  │          ELEMENT BASED ON THE FIRST IMAGE             │  │
│  │                          604                          │  │
│  └───────────────────────────────────────────────────────┘  │
│  ┌───────────────────────────────────────────────────────┐  │
│  │ GENERATE AN AUTOMATED TEST SCRIPT IN THE FIRST HUMAN  │  │
│  │ LANGUAGE BASED ON THE FIRST WORD OR PHRASE AND THE    │  │
│  │                      FIRST IMAGE                      │  │
│  │                          606                          │  │
│  └───────────────────────────────────────────────────────┘  │
│  ┌───────────────────────────────────────────────────────┐  │
│  │   OBTAIN A SECOND IMAGE OF A SECOND UI ELEMENT OF A   │  │
│  │  SECOND VERSION OF THE GUI, THE SECOND VERSION OF THE │  │
│  │  GUI BEING IN A SECOND HUMAN LANGUAGE AND THE SECOND  │  │
│  │  IMAGE HAVING A SECOND WORD OR PHRASE IN THE SECOND   │  │
│  │                    HUMAN LANGUAGE                     │  │
│  │                          608                          │  │
│  └───────────────────────────────────────────────────────┘  │
│  ┌───────────────────────────────────────────────────────┐  │
│  │  TRANSLATE THE SECOND WORD OR PHRASE INTO THE FIRST   │  │
│  │                    HUMAN LANGUAGE                     │  │
│  │                          610                          │  │
│  └───────────────────────────────────────────────────────┘  │
│  ┌───────────────────────────────────────────────────────┐  │
│  │   DETERMINE THAT THE TRANSLATED SECOND WORD OR        │  │
│  │   PHRASE CORRESPONDS TO THE FIRST WORD OR PHRASE      │  │
│  │                          612                          │  │
│  └───────────────────────────────────────────────────────┘  │
│  ┌───────────────────────────────────────────────────────┐  │
│  │ DETERMINE THAT THE SECOND UI ELEMENT CORRESPONDS      │  │
│  │     TO THE FIRST UI ELEMENT RESPONSIVE TO THE         │  │
│  │ DETERMINATION THAT THE TRANSLATED SECOND WORD OR      │  │
│  │  PHRASE CORRESPONDS TO THE FIRST WORD OR PHRASE       │  │
│  │                          614                          │  │
│  └───────────────────────────────────────────────────────┘  │
│  ┌───────────────────────────────────────────────────────┐  │
│  │  GENERATE A SECOND VERSION OF THE AUTOMATED TEST      │  │
│  │    SCRIPT IN THE SECOND LANGUAGE BASED ON THE         │  │
│  │    DETERMINATION THAT THE SECOND UI ELEMENT           │  │
│  │       CORRESPONDS TO THE FIRST UI ELEMENT             │  │
│  │                          616                          │  │
│  └───────────────────────────────────────────────────────┘  │
└─────────────────────────────────────────────────────────────┘
```

*FIG. 6*

INTERNATIONALIZATION OF AUTOMATED TEST SCRIPTS

CROSS-REFERENCE TO RELATED APPLICATIONS

This application is a national stage application under 35 U.S.C. 371 and claims the benefit of PCT Application No. PCT/CN2019/077496 having an international filing date of 8 Mar. 2019, which designated the United States, the entire contents of which are incorporated herein by reference.

BACKGROUND

A Graphical User Interface (GUI) may be automatically tested using a test script that includes commands for a replay engine to interact with a GUI element such as an input button. The test script may automatically test a GUI that was generated in the source human language such as English. For example, the test script may include a command such as "press the button labelled 'start search'." Executing the test script may automatically cause the button labelled "start search" to be pressed. As such, the test script may enable automated testing of the GUI to ensure that GUI functionality has not been altered by any changes to the GUI or an underlying application that generates the GUI. However, if the underlying application is translated into another human language, the resulting GUI for the application may also be translated. Such translation may break the automated test script since the button labelled 'start search' no longer exists.

BRIEF DESCRIPTION OF THE DRAWINGS

Features of the present disclosure may be illustrated by way of example and not limited in the following figure(s), in which like numerals indicate like elements, in which:

FIG. 5 depicts a flow diagram of an example method for internationalizing a test script in one human language to another human language; and FIG. 6 depicts a block diagram of an example non-transitory machine-readable storage medium for internationalizing a test script in one human language to another human language.

DETAILED DESCRIPTION

Figure 1:
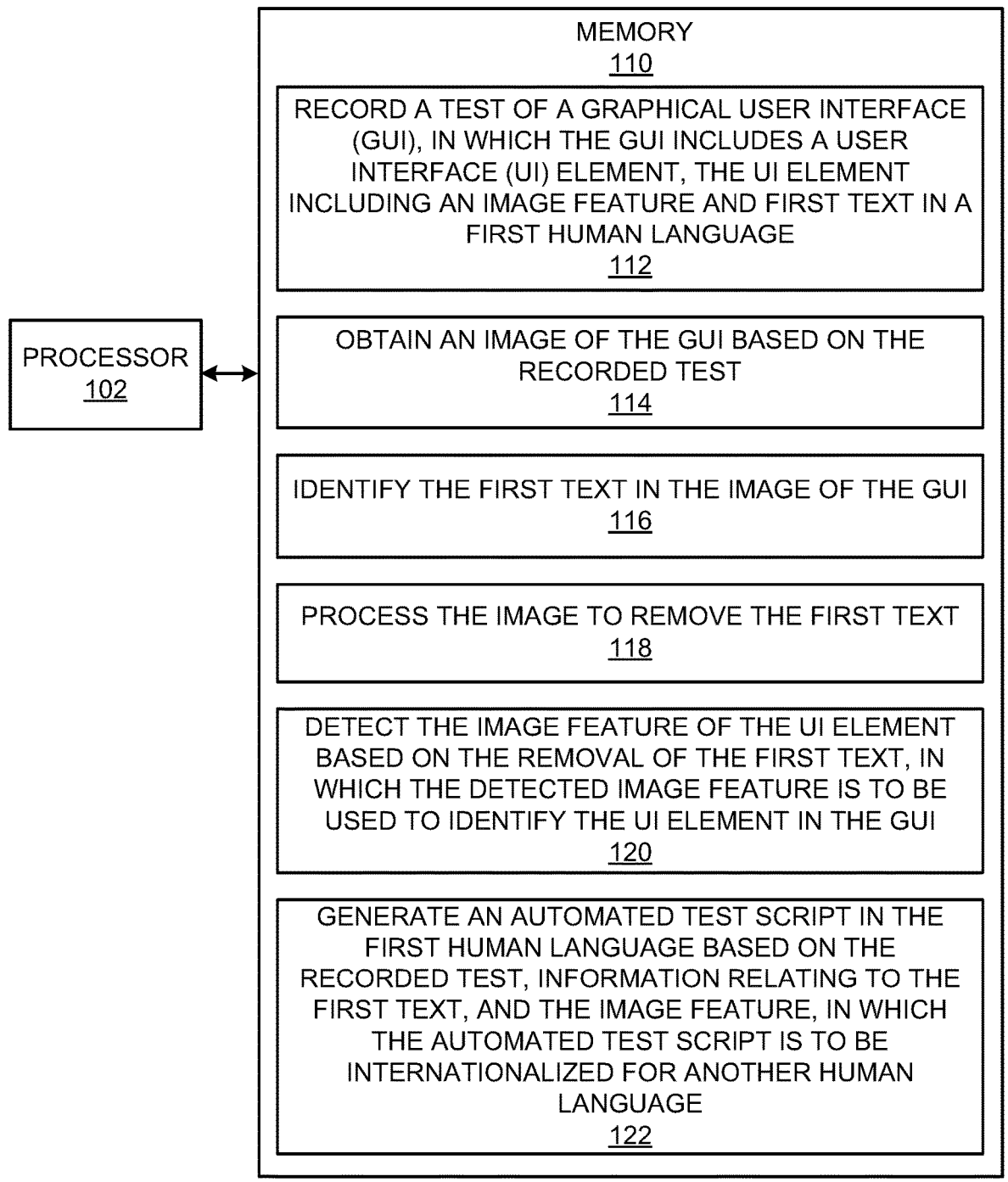
FIG. 1 shows a block diagram of an example apparatus that may internationalize a test script in one human language to another human language.

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

The present disclosure relates to a system that may internationalize automated test scripts. For example, the system may automatically internationalize recorded test scripts from one human language (as opposed to a computer or software code language) to another human language so that an automated test script may be used to test a GUI that has been translated from a source human language to a target human language. In instances in which an underlying application that generates the GUI is translated into another human language, the resulting GUI for the application may also be translated. Such translation may break the automated test script since the button labelled 'start search' no longer exists (a translated counterpart button in the translated GUI exists but the script does not recognize the button, which is now labelled in a different language). This problem may occur whenever access to the underlying GUI code is unavailable to perform direct translations, such as for closed source client-side user interfaces, Hyper Text Markup Language (HTML) for which the source HTML is not available, and/or other GUIs for which the underlying code for the GUI may be unavailable.

The system facilitates internationalization of test scripts for GUIs where underlying GUI code is unavailable. For example, the system may use computer vision techniques such as Optical Character Recognition (OCR) on screenshots or other images of GUIs that were generated while recording an automated test script. The system may recognize text from GUI elements such as input buttons based on computer vision processing. The system may perform natural language processing (NLP) on the text to understand the meaning of the text (not just the literal words or phrases). NLP may mitigate machine translation errors. To locate a GUI element and associate the GUI element with any corresponding text, the system may remove text from the GUI element. This may help identify the boundaries of the GUI element. Based on the meaning of the text and boundary of the GUI element (as well as any other GUI element and corresponding text), the system may generate a test script in a source human language by observing and recording interactions with the GUI element made by a testing user.

When the GUI has been translated into another human language, the system may translate the text in the other human language via machine translation. The system may similarly process the translated text to understand the meaning of the translated text. The system may compare the meaning of the text in the new (second) language compared with the meaning of the text from the original (first) language. A match may confirm that the translation is accurate and that the original GUI element and the translated GUI element are the same. The foregoing may be repeated for each GUI element in the GUI. A translated test script may be generated based on the translations and the confirmations. The techniques disclosed herein not only facilitate automatic internationalization of test scripts, but may also tolerate—due to the use of NLP—machine translation errors as well as text recognition errors resulting from OCR and other computer vision techniques.

As used herein, the terms "internationalizing," "internationalize," "internationalization" and similar terms refer to translating text from one human language to another human language. Such internationalization may be used in the context of translating an application and corresponding graphical user interfaces of the application from one human language to another human language. Similarly, such internationalization may be used in the context of translating an automated test script from one human language to another human language.

Reference is first made to FIG. 1, which shows a block diagram of an example apparatus 100 that may internationalize a test script in one human language to another human language. It should be understood that the example apparatus 100 depicted in FIG. 1 may include additional features and that some of the features described herein may be removed and/or modified without departing from any of the scopes of the example apparatus 100.

The apparatus 100 shown in FIG. 1 may be a computing device, a server, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scopes of the apparatus 100 disclosed herein.

The apparatus 100 may include a memory 110 that may have stored thereon machine-readable instructions (which may also be termed computer readable instructions) 112-122 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. Attention will now turn to operations at processor 102 to internationalize a test script.

Referring to FIG. 1, the processor 102 may fetch, decode, and execute the instructions 112 to record a test of a graphical user interface (GUI), in which the GUI includes a user interface (UI) element, the UI element including an image feature and first text in a first human language.

The processor 102 may fetch, decode, and execute the instructions 114 to obtain an image of the GUI based on the recorded test. For example, the processor 102 may access an image of a GUI 210A (illustrated in FIG. 2).

The processor 102 may fetch, decode, and execute the instructions 116 to identify the first text in the image of the GUI. For example, the processor 102 may perform Optical Character Recognition (OCR) and/or other computer vision on the first text.

The processor 102 may fetch, decode, and execute the instructions 118 to process the image to remove the first text. For example, the processor 102 may detect a text boundary of the first text. The processor 102 may remove the first text based on the detected text boundary.

The processor 102 may fetch, decode, and execute the instructions 120 to detect the image feature of the UI element based on the removal of the first text. In some examples, the detected image feature is to be used to identify the UI element in the GUI. For example, the processor 102 may detect an image feature 241 (illustrated in FIG. 2).

The processor 102 may fetch, decode, and execute the instructions 122 to generate an automated test script in the first human language based on the recorded test, information relating to the first text, and the image feature, in which the automated test script is to be internationalized for another human language. In some examples, the processor 102 may execute instructions to generate a second version of the automated test script to automatically test a second version of the GUI (such as GUI 210B illustrated in FIG. 3) in a second human language. For example, the processor 102 may generate a test script 351 (illustrated in FIG. 3). To do so, the processor 102 may obtain a second image of the second version of the GUI. The second image may include second text in the second human language.

The processor 102 may translate the second text from the second human language into the first human language and determine whether the translated second text corresponds to the first text. To translate the second text, the processor 102 may execute instructions to determine a distance between a first word or phrase in the second text and a second word or phrase in the second text. The processor 102 may group the first word or phrase into a first group and a second word or phrase into a second group based on the determined distance. The first group may correspond to the first text of the UI element. In this manner, the processor 102 may translate a grouping of words or phrases that may correspond to a GUI element based on the proximity of the words or phrases to one another.

The processor 102 may identify the UI element in the second version of the GUI responsive to a determination that the translated second text corresponds to the first text. To determine that the translated second text corresponds to the first text, the processor 102 may provide the first text as a first input to a natural language processor and obtain a meaning (used interchangeably herein with "intent") of the first text as an output of the natural language processor. The processor 102 may also provide the second text as an input to the natural language processor and obtain a meaning of the second text as an output of the natural language processor. The processor 102 may then compare the first meaning with the second meaning to determine whether the translated second text corresponds to the first text.

In some examples, the processor 102 may replay the second version of the automated test script on the second version of the GUI. For instance, the processor 102 may execute, based on parsing the second version of the automated test script, a user interaction with the identified UI element in the second version of the GUI.

In some examples, the processor 102 may execute instructions to obtain a second image of the GUI. The second image may correspond to a second UI element having a second image feature, determine that the second UI element has no text, and detect the second image feature of the second UI element without text removal from the second image, in which the detected second image feature is to be used to identify the second UI element in the GUI.

Figure 2:
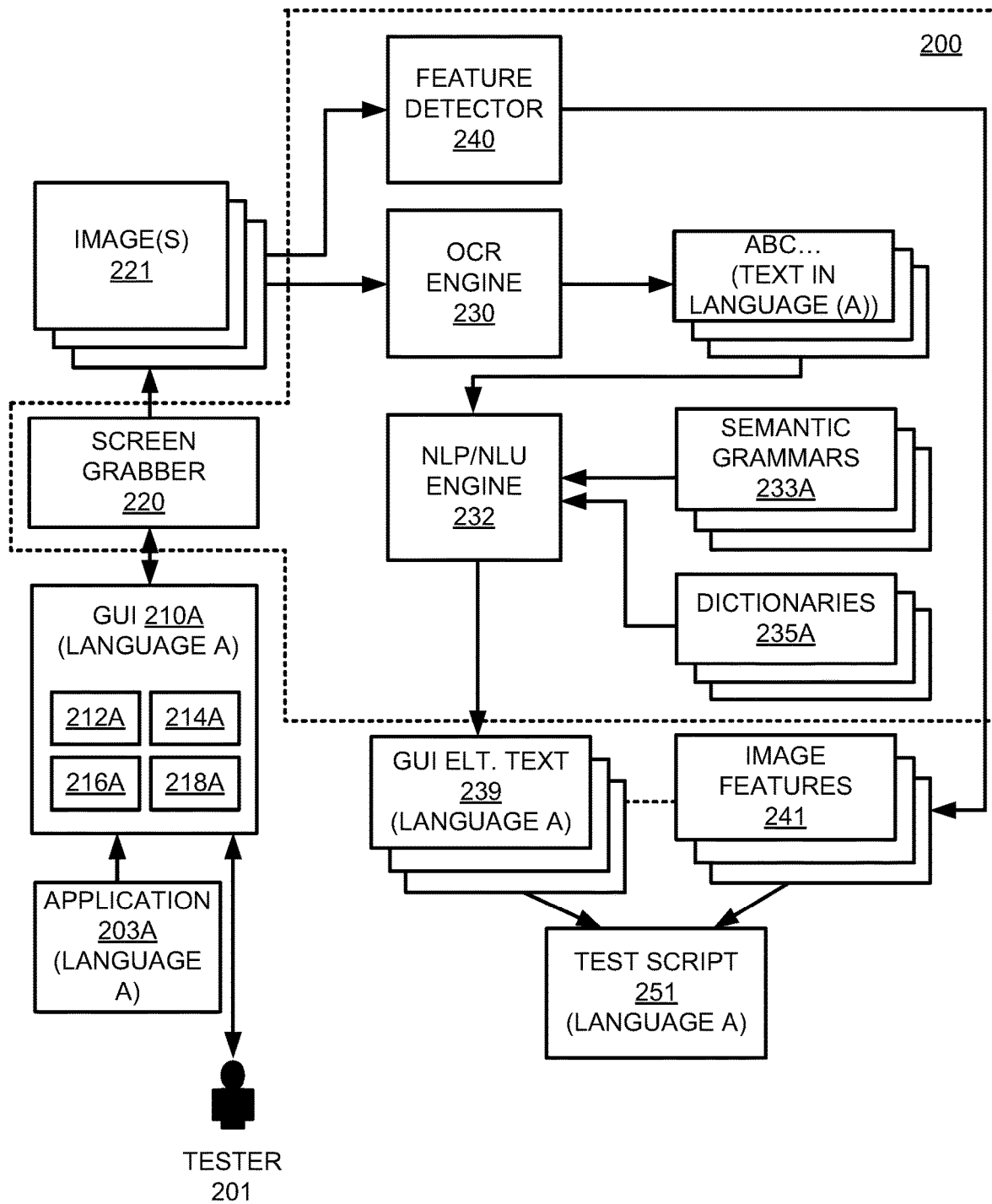
FIG. 2 shows a block diagram of a data flow of a script recording subsystem that may generate a test script (in a first human language) and recognizing text from a GUI.

FIG. 2 shows a block diagram of a data flow of a script recording subsystem 200 that may generate a test script 251 (in a first human language A) and recognizing text from a GUI 210A. As shown, an application 203A may be developed in a first human language (language A). The application 203A may generate a GUI 210A in the first human language (language A). For example, the GUI 210A may include one or more GUI elements 212A, 214A, 216A, 218A. Other numbers of GUI elements may be used as well. Each of the GUI elements 212A, 214A, 216A, 218A may include text that is displayed with the GUI elements. The text may be in the first human language (language A) since the underlying application 203A was developed using the first human language.

A tester 201 may interact with the GUI 210A. For example, the tester 201 may press the GUI element 212A, which may be configured as a button labeled with text "submit search." The tester 201 may interact with other types of GUI elements as well, such as an interaction with a GUI element 214A, which may be configured as a radio button associated with text (also in language A). User interactions may be recorded in a test script 251 in the first human language (language A), which will now be described.

In some examples, the script recording subsystem 200 may record the results (if any) of the interactions. For example, a result of an interaction with GUI element 212A may include navigating to another GUI (not illustrated), affecting a value or other aspect of another GUI element, and/or other outcome of an interaction with a GUI element. The script recording subsystem 200 may store the recorded interactions and/or results in a test script 251. The test script 251 may be in the first human language (language A) since the GUI 210A is in the first human language. In some examples, the test script 251 may be used as a set of commands to automatically test the GUI 210A. For example, a replay engine (not illustrated in FIG. 2) may use the test script 251 to conduct an automated test of the GUI 210A. In a particular example, the replay engine may parse the test script 251, access the indication that the GUI element 212A labeled "submit search" was pressed, and automatically press the "submit search" button. In some examples, if the underlying GUI code (which is separate from the code for the application 203A) for generating the GUI 210A is unavailable, the replay engine may automatically identify the button labeled "submit search" through Optical Character Recognition (OCR). As such, the replay engine may use the indications of test script 251 as automated test commands to be performed on a GUI for which the test script 251 was created. In this manner, changes to the underlying code of the application 203A may be tested to ensure that functionality of the GUI 210A has not been affected by the changes.

Although the use of test scripts such as test script 251 may automate testing of underlying code changes for applications made in a first human language, a problem may arise when an underlying application (such as application 203A) is internationalized to a second human language, resulting in a GUI (such as GUI 210A) also being internationalized to the second human language. Because the test script 251 is written in the first human language, the test script 251 may be unusable to automatically test the GUI internationalized to the second human language. For example, the replay engine may no longer be able to automatically execute the command "press the button labeled 'submit search'" on the internationalized GUI because the replay engine may be unable to locate the "submit search" button, which is in another language in the internationalized GUI.

In some examples, the tester 201 may initiate generation of the test script 251. Responsive to such an indication, a screen grabber 220 may generate images 221 of the GUI 210A through screen scraping or an operating system display interface. Each image 221 may include an image of all or a portion of the GUI 210A at a point in time. For example, each image 221 may include an image of one, some, or all GUI elements 212A-218A. A collection of images 221 may represent a "video" of the tester 201 interacting with the GUI 210A over time.

An image 221 may be processed by an OCR engine 230 and a feature detector 240. The OCR engine 230 may recognize text from the image 221. The recognized text may correspond to text associated with a GUI element 212A-218A. For example, the OCR engine 230 may recognize the text "submit search" from the image 221. In some examples, the OCR engine 230 may make mistakes when recognizing text from images. To help reduce OCR misrecognition errors, the OCR engine 230 may be configurable to change fonts and other character features to recognize specific languages. Regardless, recognition mistakes may still occur. As such, in some examples, the recognized text from the OCR engine 230 may be input to a Natural Language Processing/Natural Language Understanding (NLP/NLU) engine 232. In some examples, the NLP/NLU engine 232 may employ the Natural Language Toolkit (NLTK).

In some examples, the NLP/NLU engine 232 may use semantic grammars 233A and/or dictionaries 235A, each of which may be in the first human language (language A) to disambiguate the text recognized from the OCR engine 230. For instance, the NLP/NLU engine 232 may compare a string of words from the recognized text to the semantic grammars 233A. In some examples the semantic grammars 233A may include pre-stored arrangements of words commonly found in the first human language (language A). For instance, the semantic grammars 233A may indicate that "search" has been found to follow "submit" in a corpus of documents or according to plain speech in the second language, but not (or less frequently) vice versa. The corpus of documents may include a generic predefined semantic grammar and/or a predefined semantic grammar that is based on text of actual known GUI elements. Whichever source is used, the semantic grammars 233A may disambiguate text that may have been misrecognized by the OCR engine 230.

In some examples, the NLP/NLU engine 232 may use the dictionaries 235A to similarly disambiguate text that may have been misrecognized by the OCR engine 230. For example, a dictionary 235A may include a listing of words in the first human language. The NLP/NLU engine 232 may use the listing of words to correct any misspelled words from the OCR engine 230. In particular, if the OCR engine 230 recognized "submii search" instead of "submit search", the NLP/NLU engine 232 may correct such misrecognition based on the semantic grammars 233A indicating that "search" typically follows "submit" and/or based on the dictionary 235A indicating that the word "submit exists" but "submii" does not. It should be noted that the OCR engine 230 may also use the semantic grammars 233A and/or the dictionaries 235A prior to outputting recognized text as well.

The NLP/NLU engine 232 may output GUI element text 239 in the first human language (language A). For example, the NLP/NLU engine 232 may output "submit search" text based on processing of the images 221. Other text recognized from other GUI elements 214A-218A may be recognized and output as GUI element text 239 as well. The GUI element text 239 may be used to internationalize the test script 251 in the first human language (language A) to a second human language (language B), as will be described with reference to FIGS. 3 and 4.

In some examples, to locate a GUI element such as GUI element 212A on the GUI 210A, a feature detector 240 may identify image features 241 associated with the GUI element. An image feature 241 of a GUI element 212A-218A may include a shape or other visual characteristic of the GUI element that may be located on the GUI 310A. For example, referring to FIG. 4A, the image feature 241 of the "submit search" GUI element 312A may include a rectangle that indicates a feature boundary 403 of the GUI element 312A. By identifying the image features 241 of each of GUI elements 212A-218A, the feature detector 240 may generate location information that indicates a location of each GUI element 212A-218A on the GUI 210A as well as an association with any corresponding text, such as the "submit search" text (some GUI elements may not have any corresponding text).

Figure 4A:
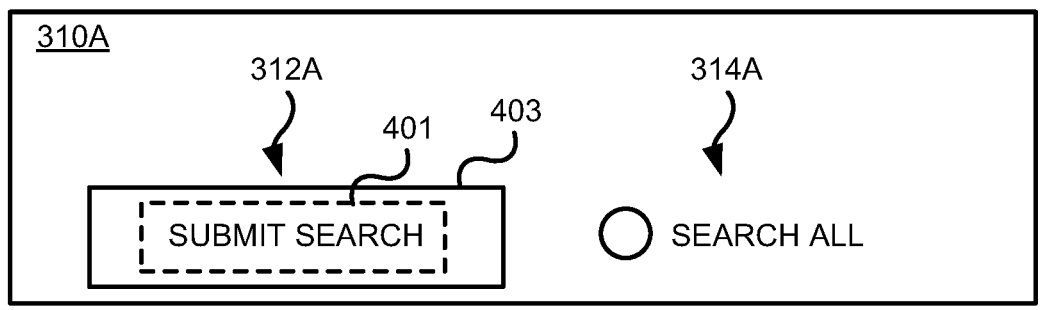
FIG. 4A shows a block diagram of an example GUI in a first human language.
Figure 4B:
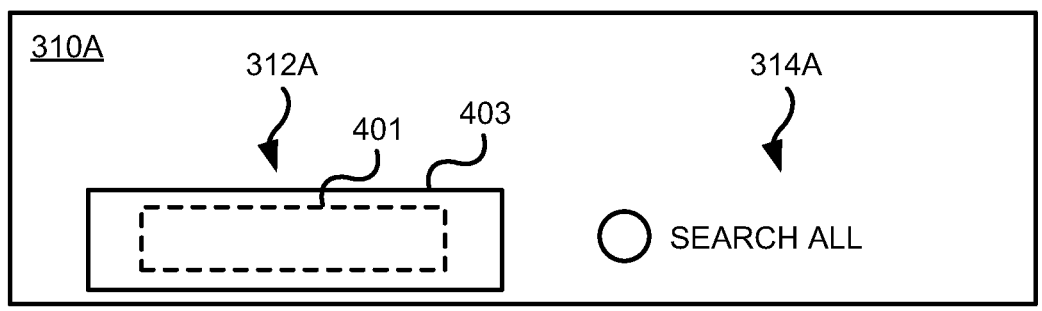
FIG. 4B shows a block diagram of an example GUI in a first human language with text removed from a GUI element to identify an image feature of the GUI element.

The location information may include a bitmap or other location indication. In some examples, any corresponding text may make it more difficult for the feature detector 240 to identify the image feature 241 of a GUI element 212A-218A that embeds the text. In these examples, the feature detector 240 may use computer vision techniques to identify a text boundary 401 of the text (if any) of the GUI element 212A-218A. For example, the feature detector 240 may use Maximally Stable Extremal Regions (MSER) and/or other feature detection techniques to identify the text boundary 401 of the text. Based on the text boundary 401, the feature detector 240 may remove the text from the GUI element 212A-218A and identify the image feature 241 of the GUI element 312A, as illustrated in FIG. 4B. The feature detector 240 may identify the image feature 241 based on a Scale-Invariant Feature Transform (SIFT) and/or other feature detection technique. The feature detector 240 may save the image features 241 of the GUI elements 212A-218A detected from the images 221 in association with the test script 251 and the GUI element text 239 (in language A). For example, the tester 201 may, during the recording, press the "submit search" button of the GUI 210A. The script recorder may identify the image feature 241 of the GUI element corresponding to the "submit search" meaning of the GUI element text 239 may be saved in association with the image feature 241.

It should be noted that the apparatus 100 illustrated in FIG. 1 may include the OCR engine 230, the NLP/NLU engine 232, and/or the feature detector 240. For example, the OCR engine 230, the NLP/NLU engine 232, and/or the feature detector 240 may be configured as instructions stored on memory 110 and executed by the processor 102. Alternatively, or additionally, the OCR engine 230, the NLP/NLU engine 232, and/or the feature detector 240 may be implemented as a hardware module of the apparatus 100.

When a test script 251, GUI element text 239, and image features 241 have been generated or otherwise detected from the GUI 210A and its associated GUI elements 212A-218A, the GUI 210A may be automatically tested in the first human language (language A). For example, a replay engine (not illustrated in FIG. 2) may parse the test script 251, and automatically reproduce the interactions encoded therein. In a particular example, the replay engine may parse the test script 251, determine that the "submit search" button was pressed, locate the "submit search" button on a GUI being tested (through OCR or GUI tags that label such buttons in the first language), and select the submit search button. However, as will be described with reference to FIG. 3, if the underlying application 203A has been internationalized to a second human language (language B), then the test script 251 may no longer function to automatically test the resulting internationalized GUI.

Figure 3:
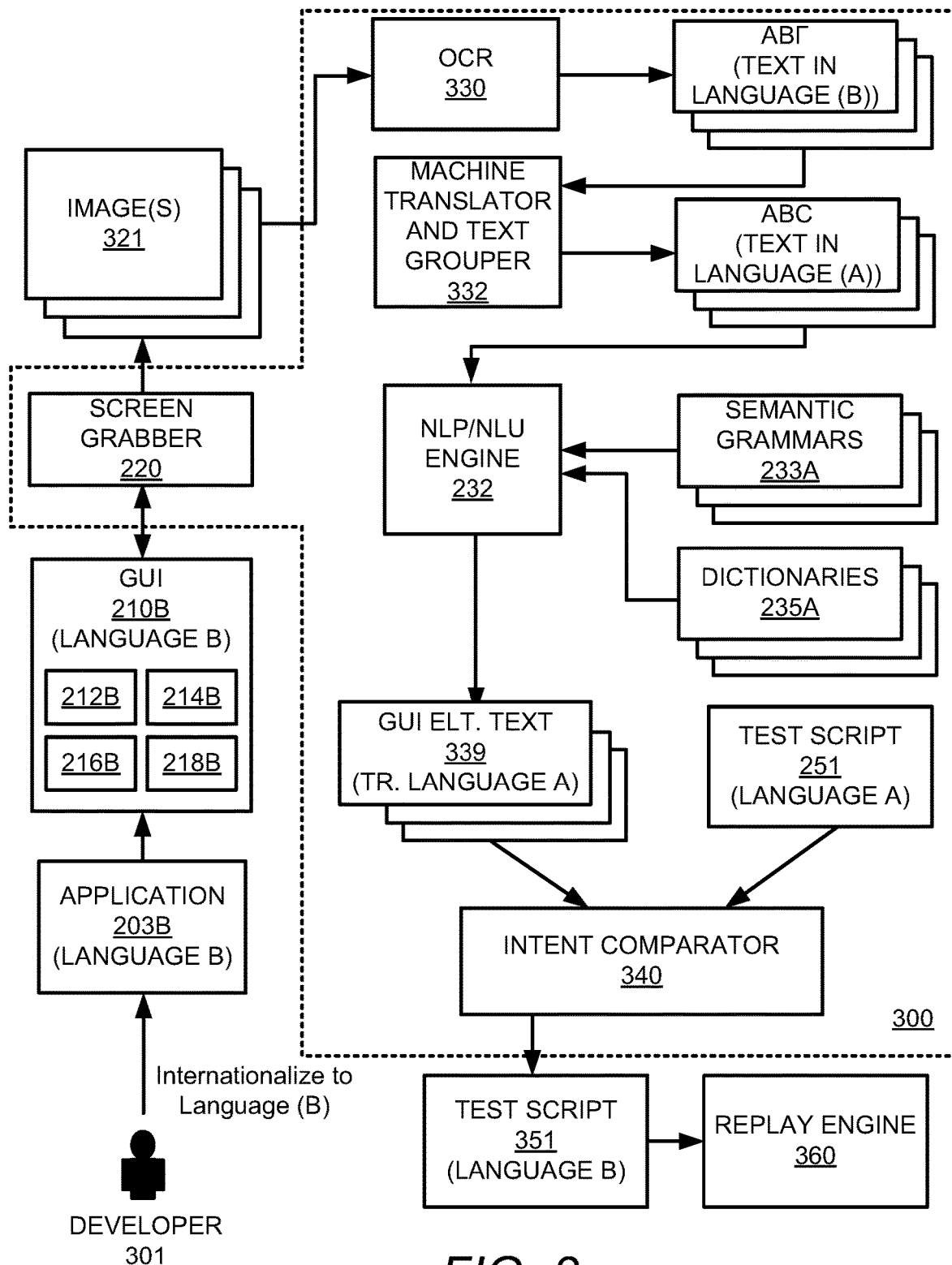
FIG. 3 shows a block diagram of an example data flow for analyzing a GUI internationalized from a first human language to a second human language to convert a test script written in the first human language to the second human language.

FIG. 3 shows a block diagram of a data flow for analyzing a GUI 210B internationalized from a first human language (language A) to a second human language (language B) to convert a test script written in the first human language to the second human language.

For example, a developer 301 may internationalize application 203A (illustrated in FIG. 2) in the first human language (language A) to generate application 203B in the second human language (language B). Doing so may result in a GUI 210B, which is an internationalized version of GUI 210A (illustrated in FIG. 2). For example, the text (if any) of GUI elements 212B-218B may be written in the second human language (language B) by virtue of the underlying application 203B being internationalized from the first human language to the second human language. The test script converter subsystem 300 may convert the test script 251 in the first human language (language A) to a test script 351 in the second human language (language B).

For example, the test script converter subsystem 300 may access each interaction encoded in the test script 251. If the accessed interaction includes an interaction with a GUI element that does not have corresponding text, the test script converter subsystem 300 may add the interaction to the test script 351B being generated. This is because a replay engine, such as replay engine 360, may be able to replay the interaction as-is without any text translation. On the other hand, for interactions with GUI elements having corresponding text, the test script converter subsystem 300 may identify the corresponding (translated) text in the second human language (language B) that appears in the GUI 210B, and update the test script 351 accordingly.

Continuing previous examples, the test script converter subsystem 300 may access, from the test script 251, the interaction indicating that the "submit search" button was pressed. As previously noted, the replay engine 360 will not be able to replay this interaction because the GUI 210B may be translated to the second human language (language B). The test script converter subsystem 300 may identify all of the GUI elements 212B-218B in GUI 210B associated with text in the second human language (language B) and match them with the interactions accessed in test script 251. For example, the test script converter subsystem 300 may identify a GUI element 212B corresponding to the "submit search" button so that the test script 251 may be revised to indicate that the replay engine 360 should automatically press the corresponding GUI element 212B. It should be noted that the foregoing and following process illustrated in FIG. 3 may be performed "on-the-fly" by the replay engine 360, which may call the test script converter subsystem 300 for each GUI element having corresponding text in a test script 251 or may be performed in batch mode to pre-generate test script 351 in the second human language.

Figure 4C:
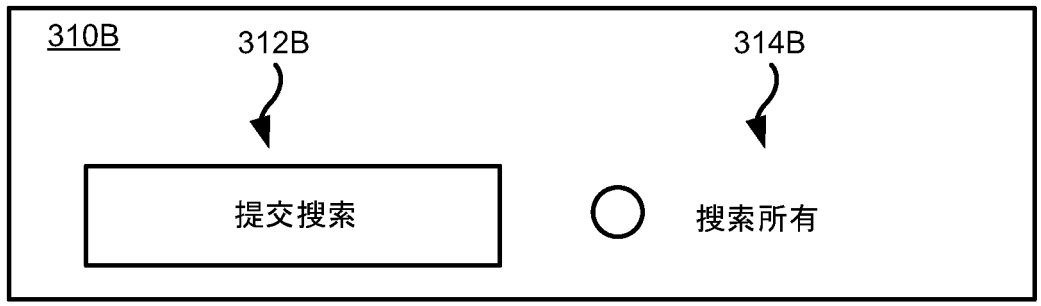
FIG. 4C shows a block diagram of the GUI shown in FIGS. 4A and 4B internationalized to a second human language.

In some examples, the screen grabber 220 may generate images 321, which may be similar to the images 221 illustrated in FIG. 2, except that the imaged GUI elements 212B-218B of the images 321 may include text in the second human language. Referring to FIG. 4C, for example, an image 321 may capture GUI element 312B and 314B, which respectively correspond to translated versions of GUI elements 312A and 314A.

An OCR engine 330 may recognize text from the images 321, similar to the way in which the OCR engine 230 illustrated in FIG. 2 recognizes text in the first human language except that text in the second human language may be recognized by the OCR engine 330. For instance, the OCR engine 330 may be the same as OCR engine 230, except that the OCR engine 330 may use a language configuration suitable for the second human language. Alternatively, the OCR engine 330 may use an entirely different image recognition technique than the OCR engine 230. It should be noted that the OCR engine 330 may also use semantic grammars 233A and/or the dictionaries 235A prior to outputting recognized text as well.

Figure 4D:
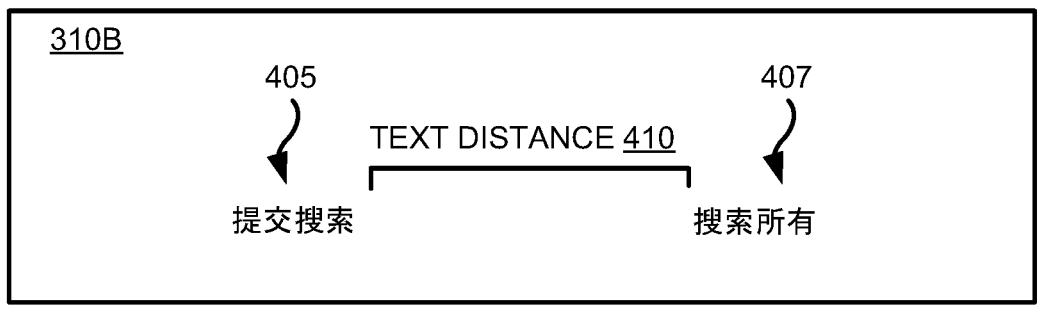
FIG. 4D shows a block diagram of the GUI shown in FIGS. 4A and 4B internationalized to a second human language and showing a text distance to determine groupings of text.

In some examples, the text in the second human language (language B) may be input to a machine translator and text grouper 332. The machine translator and text grouper 332 may group the text in the second human language into groups based on relative distance between each item of text. For example, referring to FIG. 4B, the machine translator and text grouper 332 may compare a text distance 410 between two words or characters to a threshold distance. The text distance 410 may be measured in bit distances between text boundaries. If the text distance 410 is below a threshold distance, then the machine translator and text grouper 332 may group the words or characters into a group (such as groups 405 and 407). The machine translator and text grouper 332 may repeat the distance comparisons for each word or character. Each group of words or characters may therefore correspond to text of a respective GUI element 212B-218B. For example, as illustrated in FIG. 4D, group 405 may correspond to GUI element 312B and group 407 may correspond to GUI element 314B. The text grouping may, in some examples, be sufficient for purposes of identifying text in the GUI 210B that corresponds to text in the test script 251. In other words, it may be unnecessary to localize text in the GUI 210B to specific image features of GUI elements 212B-218B because it may be sufficient to obtain the text in GUI 210B for mapping text in the second human language that appears in the GUI 210B to the interactions of the test script 251 in the first human language. Still, in some examples not illustrated in FIG. 3, image features may be detected similar to image feature detection illustrated in FIG. 2 to improve the mapping of text in GUI 210B to text in GUI 210A.

The machine translator and text grouper 332 may translate the grouped text from the second human language (language B) to the first human language (language A). In some examples, the machine translator and text grouper 332 may translate the text before grouping.

In some examples, the machine translator and text grouper 332 may make translation errors, which may be tolerated based on NLP/NLU operations of the NLP/NLU engine 232. For example, the NLP/NLU engine 232 may determine a meaning of the translated text, similar to the manner in which the NLP/NLU engine 232 determined a meaning of text described with respect to FIG. 2. In particular, the NLP/NLU engine 232 may use the semantic grammars 233A and/or dictionaries 235A to determine GUI element text 339 of the machine translation. More particularly, the NLP/NLU engine 232 may determine a meaning of the text output by the machine translator and text grouper 332. However, instead of correcting misrecognition of words resulting from OCR as described in FIG. 2, the NLP/NLU engine 232 in this context may correct mistranslation of words by the machine translator and text grouper 332. Furthermore, by understanding an intent of the translated words, the NLP/NLU engine 232 may correct for synonyms or non-exact but similar word translations. For example, continuing the "submit search" example, the internationalized GUI 310B may include a translation of "submit search" in the second human language (language B), which may or may not directly translate to "submit search". Due to two rounds of translation—from the first human language (language A) to the second human language (language B) then back to the first human language (language A)—and/or OCR misrecognition errors, the translated words may include "process search" instead of "submit search."

The intent comparator 340 may compare each GUI element text 339, each of which may correspond to a GUI element 212B-218B, and compare the GUI Element text 339 to the GUI element text in the test script 251. Continuing the previous examples, the intent comparator 340 may compare the GUI element text 339, "process search", with an interaction with "submit search" found in the test script 251. The intent comparator 340 may determine that the intents are the same or similar and therefore may be used interchangeably for automated test purposes.

The intent comparator 340 may make the determination in various ways. For example, the intent comparator 340 may generate a match score. The match score may indicate the similarity of the letters, characters, and/or words between the GUI element text 339 and text from test script 251 that refers to a GUI element. The match score may be compared to a threshold match score. To generate the match score, the intent comparator 340 may make a literal comparison by determining an edit distance between the letters, characters, and/or words between the GUI element text 339 and text from the test script 251 that refers to a GUI element. The edit distance may be a measure of similarity or dissimilarity of two strings of text. For example, the edit distance may include a measure such as a count of the transformation operations that may be required to transform the GUI element text 339 to the text from the test script 251 that refers to a GUI element (or vice versa). In these examples, the match score may be based on (such as include) the edit distance. Alternatively, or additionally, the intent comparator 340 may generate the match score based on semantic grammars or other intent definitions to determine whether one phrase, such as "submit search" is similar in intent to another phrase, such as "process search." The intent comparator 340 in these examples may assign a match score based on the similarity match.

If the intents are the same or similar, the intent comparator 340 may update the identification of the corresponding GUI element in the test script 251 to use the GUI element in the second language with the matching intent. For example, the intent comparator 340 may replace the "submit search" GUI element text in the first human language of the test script 251 with the text in the second human language that was translated by the machine translator and text grouper 332 to "process search." The test script converter subsystem 300 may repeat the similarity comparison for each GUI element in the test script 251. In this way, a replay engine may be able to locate the appropriate GUI element in the GUI 210B.

It should be noted that in some examples, the NLP/NLU engine 232 may analyze the text prior to translation back to the first human language. In these examples, the NLP/NLU engine 232 may use semantic grammars and/or dictionaries that are in the second human language (language B). Further in these examples, after determining the intent of the words based on NLP/NLU engine 232, the machine translator and text grouper 332 may translate the determined intent to the first human language.

It should be further noted that the apparatus 100 illustrated in FIG. 1 may include the OCR engine 330, the machine translator and text grouper 332, and/or the intent comparator 340. For example, the OCR engine 330, the machine translator and text grouper 332, and/or the intent comparator 340 may be configured as instructions stored on memory 110 and executed by the processor 102. Alternatively, or additionally, the OCR engine 330, the machine translator and text grouper 332, and/or the intent comparator 340 may be implemented as a hardware module of the apparatus 100.

Various manners in which the apparatus 100 may operate to internationalize test scripts are discussed in greater detail with respect to the method 500 depicted in FIG. 5. It should be understood that the method 500 may include additional operations and that some of the operations described therein may be removed and/or modified without departing from the scopes of the method 500. The description of the method 500 may be made with reference to the features depicted in FIGS. 1-4 for purposes of illustration.

FIG. 5 depicts a flow diagram of an example method 500 for internationalizing a test script in one human language to another human language.

As shown in FIG. 5, at block 502, the processor 102 may obtain, by a processor, an automated test script in a first human language, the automated test script to automatically test a graphical user interface (GUI) in the first human language, in which the GUI includes a user interface (UI) element, the UI element may include an image feature and a first word or phrase in the first human language.

At block 504, the processor 102 may obtain an image of a second version of the GUI in a second human language.

At block 506, the processor 102 may translate a second word or phrase of the second version of the GUI into the first human language based on the image.

At block 508, the processor 102 may determine that the translated second word or phrase corresponds to the first word or phrase. For example, the processor 102 may determine a first meaning of the first word or phrase and a second meaning of the second word or phrase based on natural language processing, compare the first meaning and the second meaning, and determine a match score based on the comparison, in which the determination that the translated second word or phrase corresponds to the first word or phrase is based on the match score. For example, the match score may include a match score generated by the intent comparator 340 illustrated in FIG. 3.

At block 510, the processor 102 may identify the UI element in the second version of the GUI responsive to the determination that the translated second word or phrase corresponds to the first word or phrase.

At block 512, the processor 102 may generate a second version of the automated test script in the second language based on the identification of the UI element.

In some examples, the processor 102 may replay the second version of the automated test script to automatically test the second version of the GUI. For example, the processor 102 may interact with the identified UI element in the second version of the GUI.

Some or all of the operations set forth in the method 500 may be included as utilities, programs, or subprograms, in any desired computer accessible medium. In addition, the method 500 may be embodied by computer programs, which may exist in a variety of forms. For example, some operations of the method 500 may exist as machine-readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

FIG. 6 depicts a block diagram of an example non-transitory machine-readable storage medium for internationalizing a test script in one human language to another human language. The non-transitory machine-readable storage medium 600 may be an electronic, magnetic, optical, or other physical storage device that includes or stores executable instructions. The non-transitory machine-readable storage medium 600 may be, for example, Random Access memory (RAM), an Electrically Erasable Programmable Read-Only Memory (EEPROM), a storage device, an optical disc, and the like. The non-transitory machine-readable storage medium 600 may have stored thereon machine-readable instructions 602-616 that a processor, such as the processor 102, may execute.

The machine-readable instructions 602, when executed by the processor, may cause the processor to obtain a first image of a first user interface (UI) element of a GUI, the GUI being in a first human language and the first image having a first word or phrase in the first human language.

The machine-readable instructions 604, when executed by the processor, may cause the processor to identify the first word or phrase of the first UI element based on the first image. To do so, the machine-readable instructions 604, when executed by the processor, may cause the processor to apply a Maximally Stable Extremal Regions (MSER) feature detector to the first image, and identify a boundary of the first word or phrase of the first UI element based on the applied MSER. In some examples, the machine-readable instructions 604, when executed by the processor, may cause the processor to correlate the identified first word or phrase with the first UI element. To do so, the machine-readable instructions 604, when executed by the processor, may cause the processor to apply a Scale-Invariant Feature Transform (SIFT) feature detector to the first image, identify an image feature of the first UI element based on the applied SIF, and store an association between the first word or phrase and the image feature of the first UI element.

The machine-readable instructions 606, when executed by the processor, may cause the processor to generate an automated test script in the first human language based on the first word or phrase and the first image.

The machine-readable instructions 608, when executed by the processor, may cause the processor to obtain a second image of a second UI element of the GUI, the GUI being in a second human language and the second image having a second word or phrase in the second human language.

The machine-readable instructions 610, when executed by the processor, may cause the processor to translate the second word or phrase into the first human language.

The machine-readable instructions 612, when executed by the processor, may cause the processor to determine that the translated second word or phrase corresponds to the first word or phrase.

The machine-readable instructions 614, when executed by the processor, may cause the processor to determine that the second UI element corresponds to the first UI element responsive to the determination that the translated second word or phrase corresponds to the first word or phrase.

The machine-readable instructions 616, when executed by the processor, may cause the processor to generate a second version of the automated test script in the second language based on the determination that the second UI element corresponds to the first UI element. For example, machine-readable instructions 616 may cause the processor to replace the first word or phrase of the first UI element in the test script with the second word or phase in the second language.

In some examples, non-transitory machine-readable storage medium 600 may include further instructions that, when executed by the processor, cause the processor to identify a UI element not associated with text in the first image, identify, in the first test script, a command that corresponds to the UI element not associated with text, and copy the command into the second test script. In this manner, any command in the first test script that is associated with an interaction with a GUI element that does not include text may be retained in the second version of the test script without having to make a translation.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method comprising:
recording a test of a graphical user interface (GUI), wherein the GUI includes a user interface (UI) element, the UI element comprising an image feature and first text in a first human language;
obtaining an image of the GUI based on the recorded test;
locating the first text in the image of the GUI;
processing the image to remove the first text;
detecting the image feature of the UI element based on the removal of the first text, wherein the detected image feature is to be used to identify the UI element in the GUI;
generating an automated test script in the first human language based on the recorded test, information relating to the first text, and the image feature, wherein the automated test script is internationalized into a second human language;
obtaining a second image of a second version of the GUI, the second image comprising the second text in the second human language;
determining a distance between a first word or phrase in a second text and a second word or phrase in the second text;
grouping the first word or phrase into a first group and the second word or phrase into a second group based on the determined distance; and
comparing a first translation of the first group with the first text and a second translation of the second group with the first text to determine which one of the first group or the second group corresponds to the first text.

2. The method of claim 1, further comprising:
detecting a text boundary of the first text, wherein the first text is removed from the UI element based on the detected text boundary.

3. The method of claim 1, further comprising:
generating a second version of the automated test script to automatically test the second version of the GUI in the second human language.

4. The method of claim 3, wherein
identifying the UI element in the second version of the GUI responsive to a determination that the translated second text corresponds to the first text.

5. The method of claim 4, further comprising:
replaying the second version of the automated test script on the second version of the GUI, wherein the replay includes execution of a user interaction with the identified UI element in the second version of the GUI.

6. The method of claim 4, further comprising:
providing the first text as a first input to a natural language processor; and
obtaining a first output from the natural language processor, the first output including a first meaning of the first text, wherein the information relating to the first text comprises the first output;
wherein determining whether the translated second text corresponds to the first text, further comprises:
providing the translated second text as a second input to the natural language processor;
obtaining a second output from the natural language processor, the second output including a second meaning of the second text; and
comparing the first meaning with the second meaning.

7. The method of claim 1, wherein identifying the first text further comprises performing optical character recognition on the image of the GUI.

8. The method of claim 1, further comprising:
determining that the second UI element has no text; and
detecting the second image feature of the second UI element without text removal from the second image, wherein the detected second image feature is to be used to identify the second UI element in the GUI.

9. The method of claim 1, wherein the second human language comprises a different character set compared to the first human language.

10. An apparatus comprising:
a processor; and
a non-transitory computer readable medium on which is stored instructions that, when executed by the processor, cause the processor to:
record a test of a graphical user interface (GUI), wherein the GUI includes a user interface (UI) element, the UI element comprising an image feature and first text in a first human language;
obtain an image of the GUI based on the recorded test;
locate the first text in the image of the GUI;
process the image to remove the first text;
detect the image feature of the UI element based on the removal of the first text, wherein the detected image feature is to be used to identify the UI element in the GUI;
generate an automated test script in the first human language based on the recorded test, information relating to the first text, and the image feature, wherein the automated test script is internationalized into a second human language;
obtain a second image of a second version of the GUI, the second image comprising the second text in the second human language;
determine a distance between a first word or phrase in the second text and a second word or phrase in the second text;
group the first word or phrase into a first group and the second word or phrase into a second group based on the determined distance; and compare a first translation of the first group with the first text and a second translation of the second group with the first text to determine which one of the first group or the second group corresponds to the first text.

11. The apparatus of claim 10, wherein the instructions that, when executed by the processor, further cause the processor to:
detect a text boundary of the first text, wherein the first text is removed from the UI element based on the detected text boundary.

12. The apparatus of claim 10, wherein the instructions further cause the processor to:
generate a second version of the automated test script to automatically test the second version of the GUI in the second human language.

13. The apparatus of claim 12, wherein the instructions further cause the processor to:
identify the UI element in the second version of the GUI responsive to a determination that the translated second text corresponds to the first text.

14. The apparatus of claim 13, wherein the instructions further cause the processor to:
replay the second version of the automated test script on the second version of the GUI, wherein the replay includes execution of a user interaction with the identified UI element in the second version of the GUI.

15. The apparatus of claim 13, wherein the instructions are further to cause the processor to:
provide the first text as a first input to a natural language processor; and
obtain a first output from the natural language processor, the first output including a first meaning of the first text, wherein the information relating to the first text comprises the first output;
wherein to determine whether the translated second text corresponds to the first text, the instructions are further to cause the processor to:
provide the translated second text as a second input to the natural language processor;
obtain a second output from the natural language processor, the second output including a second meaning of the second text; and
compare the first meaning with the second meaning.

16. The apparatus of claim 10, wherein to identify the first text, the instructions are further to cause the processor to:
perform optical character recognition on the image of the GUI.

17. The apparatus of claim 10, wherein the instructions are further to cause the processor to:
determine that a second UI element has no text; and
detect a second image feature of the second UI element without text removal from the second image, wherein the detected second image feature is to be used to identify the second UI element in the GUI.

18. The apparatus of claim 10, wherein the second human language comprises a different character set compared to the first human language.

19. A non-transitory computer readable medium comprising instructions that, when read by a machine, cause the machine to perform:
recording a test of a graphical user interface (GUI), wherein the GUI includes a user interface (UI) element, the UI element comprising an image feature and first text in a first human language;
obtaining an image of the GUI based on the recorded test;
locating the first text in the image of the GUI;
processing the image to remove the first text;
detecting the image feature of the UI element based on the removal of the first text, wherein the detected image feature is to be used to identify the UI element in the GUI;
generating an automated test script in the first human language based on the recorded test, information relating to the first text, and the image feature, wherein the automated test script is internationalized into a second human language;
obtaining a second image of a second version of the GUI, the second image comprising the second text in the second human language
determining a distance between a first word or phrase in a second text and a second word or phrase in the second text;
grouping the first word or phrase into a first group and the second word or phrase into a second group based on the determined distance; and
comparing a first translation of the first group with the first text and a second translation of the second group with the first text to determine which one of the first group or the second group corresponds to the first text.

\* \* \* \* \*